350-6.6

6/9/81 OR 4,272,151 SR

United States Patent [19]

Balasubramanian

[11] 4,272,151

[45] Jun. 9, 1981

[54] APPARATUS FOR OPTICAL SCANNING

[76] Inventor: N. Balasubramanian, P.O. Box 884, Cupertino, Calif. 95014

[21] Appl. No.: 89,759

[22] Filed: Oct. 30, 1979

[51] Int. Cl.[3] .................... G02B 27/17

[52] U.S. Cl. .................... 350/6.6; 350/6.8; 346/108

[58] Field of Search .................... 350/6.1-6.91, 350/285, 296, 175 FS, DIG. 2, 190, 204, 358; 250/236, 235; 358/208, 206, 293; 346/108, 109, 76 L

[56] References Cited

U.S. PATENT DOCUMENTS

| | | | |
|---|---|---|---|
| 3,469,030 | 9/1969 | Priebe | 250/236 |
| 3,501,586 | 3/1970 | Russell | 179/100.3 P |
| 3,531,184 | 9/1970 | Adler | 350/358 |
| 3,624,284 | 11/1971 | Russell | 365/127 |
| 3,625,585 | 12/1971 | Beiser | 350/285 |
| 3,667,360 | 6/1972 | Vicik | 350/6.7 |
| 3,713,721 | 1/1973 | Watson | 346/108 |
| 3,729,248 | 4/1973 | Bedochaud | 174/41 |
| 3,733,979 | 5/1973 | England | 350/6.91 |
| 3,752,559 | 8/1973 | Fletcher et al. | 350/204 |
| 3,795,902 | 3/1974 | Russell | 365/127 |
| 3,806,643 | 4/1974 | Russell | 358/130 |
| 3,873,186 | 3/1975 | Bousky | 350/6.8 |
| 3,891,794 | 6/1975 | Russell | 358/130 |
| 3,995,110 | 11/1976 | Starkweather | 358/293 |
| 4,000,493 | 12/1976 | Spaulding et al. | 346/108 |
| 4,054,367 | 10/1977 | Eschler et al. | 350/DIG. 2 |
| 4,099,829 | 7/1978 | Straayer | 350/6.1 |

FOREIGN PATENT DOCUMENTS

| | | | |
|---|---|---|---|
| 5080359 | 1/1977 | Japan | 358/206 |
| 1124967 | 8/1968 | United Kingdom | 350/6.6 |

OTHER PUBLICATIONS

Fleischer, J. M. et al., "Laser Optical System . . . ", *IBM Jour. of Research & Development*, vol. 21, No. 5, Sep. 77.

*Laser Focus*, page, May 1977.

Merry, J. B., "Tech. Report on Multibeam Laser Scanning", Isomet Corp., Aug. 1978.

Emmel, Peter M. et al., "Laser Printers . . . ", *SPIE*, vol. 169, *Laser Printing*, 1979, pp. 60-70.

*Primary Examiner*—Jon W. Henry

*Attorney, Agent, or Firm*—C. Michael Zimmerman

[57] ABSTRACT

An apparatus is described which provides optical scanning with both high resolution and high speed. A low resolution acousto-optic deflector is scan-center coupled with a rotating scanner to allow high scanning speed without degrading the resolution characteristics associated with a rotating scanner. A mirror having a parabolic reflective surface exhibiting spherical aberration cooperates with a rotating multi-faceted cylindrical mirror to maintain the imaging focal point of the beam provided by the apparatus in a flat image field as the beam is caused to scan the field.

3 Claims, 6 Drawing Figures

APPARATUS FOR OPTICAL SCANNING

BACKGROUND OF THE INVENTION

The present invention relates to optical scanning and, more particularly, to a method and apparatus for optical scanning providing both the high resolution and high speed desired for applications such as non-impact printing and computer input/output.

Because from the theoretical standpoint optical scanning can provide great speed in information processing, much work has been undertaken to develop practical optical scanning systems for printing and/or reading information. This work has resulted in the development of systems which meet specific word processing or computer input/output criteria. In general, however, such systems are complex and expensive because of the extreme fabrication tolerances which must be met in order to provide both the high resolution and high speed typically required.

Most optical scanning systems use a rotating scanner of some sort which deflect a beam of optical radiation across the area it is desired be scanned. The difficulty with mechanically rotated optical scanners, though, is that fabrication tolerances and complexities escalate enormously, as faster scan rates (and consequently faster rotational speeds of the scanner) are sought. Achievable scanning rates are thereby limited as a practical matter.

Another problem associated with a rotating scanner is that as its deflecting surface or surfaces rotate to provide scanning, the focal point at which an image is focused traces a curved line or surface. Thus, in the absence of steps to change the point of focus as the deflecting surface rotates, the field at which the focused image will be provided, will be a curved surface. Some have attempted to correct for this curved focus field by providing a curved mechanism to support the medium which is to be scanned. In high speed printing or photographic imaging, though, it is necessary that the medium upon which the printing or image is being formed move rapidly through the image field. Because of the difficulty of providing rapid movement through a relatively uniformly curved space, most of those working in the field have found it necessary to turn to relatively costly and expensive optics to vary the imaging focal length of the scan and thereby provide a generally flat image field.

Acousto-optic deflectors are used in some scanning systems in place of mechanically rotated scanners. While generally faster scanning can be accomplished with an acousto-optic deflector, the resolution obtainable with such a scanner typically is significantly lower than that obtainable with a rotating scanner. Moreover, the deflection rate achievable with an acousto-optic deflector, although faster than that achievable with a rotating scanner, is also limited by the "cylindrical lens effect" (to be discussed in more detail below) unless relatively expensive optical elements are used for correction.

It can be seen from the above that scanning systems relying separately on either rotating scanners or acousto-optic deflectors are not optimum. Most of such scanners provide either high resolution or high speed. That is, if it is desired that a high resolution image be provided, it is at the sacrifice of speed. On the other hand, if high speed scanning is desired, it generally only can be achieved at the sacrifice of resolution. It is because of the desire to achieve both high resolution and high speed in a single application that most scanning systems are quite complex and expensive.

SUMMARY OF THE INVENTION

The present invention provides, among other things, an optical scanning system which enables both high resolution and high speed to be achieved without the use of relatively complex optics or extreme fabrication tolerances. To this end, the system of the invention includes a pair of deflecting units which are series coupled in a manner assuring that the properties of one compensate for the limitations of the other to achieve with one system, both high resolution and high speed. As will become apparent from the more detailed description of a preferred embodiment of the instant invention, a simple optical element which exhibits spherical aberration is disposed to intercept a beam directed to scan an image field and cooperate with other optical elements associated with the scanning system to maintain the imaging focal point of the beam in a flat image field as the beam is caused to scan the field. The variation of focal length provided by the spherical aberration is utilized to accomplish this by altering the length of the optical path followed by the beam directed to impinge the simple optical element in a complimentary manner to the variation in focal length resulting from the spherical aberration.

The invention includes other features and advantages which will be described or will become apparent from the following more detailed description of preferred embodiments.

BRIEF DESCRIPTION OF THE DRAWING

With reference to the accompanying three sheets of drawing.

DETAILED DESCRIPTION OF THE PREFERRED EMBODIMENTS

Figure 1:
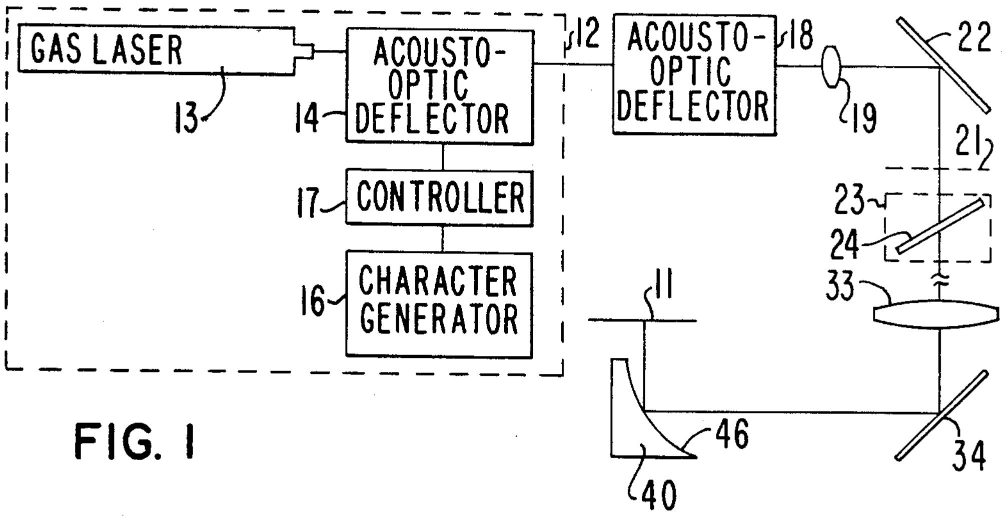
FIG. 1 is a schematic illustration of a preferred embodiment in which a scan writing apparatus of the instant invention is used.

The conventional approach to displaying a page of alphanumeric characters at an image field, is to scan the page in a straight raster scan pattern. In such a pattern, each line of page characters is made up of a plurality of vertically adjacent, horizontal lines. It will be recognized that it is necessary at the time each raster scan line is formed that all of the information for the full page line be available. In other words, each horizontal raster scan line will contain a horizontal segment of the many alphanumeric characters which are to be displayed on the page line. The number of raster scans required to define a page line depends, of course, upon the resolution of the optical system and its relationship to the display height of the page line. A typical printing scanning system now has 50 raster scan lines per page line. Each raster scan line is, in effect, a plurality of points or spots, and with present resolution it is desirable to provide at least 50 points or spots horizontally to define each character. This means that for each character in a page line it is necessary to store 2500 data points (50 lines times 50 points).

From the above it will be recognized that conventional raster scanning with optical systems requires significant storage of information. At least the data defining each page line must be stored for the full number of raster scan lines required to define such page line. Moreover, any information registration problems associated with scanning generally will affect a whole page line. And the printing speed requirements can only be met by brute force, i.e., increasing the speed of raster line scans by a proportionate amount. As mentioned previously, this generally is accomplished only at the sacrifice of resolution.

In contrast to the above, the present invention facilitates the formation of a plurality of optical field matrices, each one of which contains an individual segment of the information it is desired be displayed on the image field at any given time. Each matrix can define, for example, a complete alphanumeric character. Projections of the optical field matrices are scanned between the discrete locations at which the information respectively contained in each is to be displayed. This scanning can be, for example, scanning in a raster scan pattern.

The phrase "individual segments" of information as used herein is meant to encompass both the complete information to be displayed at a particular location at a given time and a portion of such information which, for example, must be overlapped or added to other information to define the complete information for such location. Moreover, it will be recognized that the formation of the optical matrix or matrices can be thought of in two different ways, i.e., the formation of a single optical matrix which is then modulated to define the differing segments of information, and the formation of a plurality of optical matrices each one of which is associated with a display area and contains an individual segment of the full information it is desired be displayed thereat. These two different approaches to an understanding of the invention are used interchangeably herein, depending upon each in understanding the context of the discussion within which the matrix or matrices referral appears.

FIG. 1 schematically illustrates a preferred embodiment of optical scanning apparatus in which the present invention can be incorporated. Such apparatus is designed to project to display area 11, a generally flat image field of the information to be displayed. Such system includes means enclosed within dotted line enclosure 12 for generating a beam of optical radiation which defines the information to be projected to display area 11. The generating means includes a source of optical radiation, in the form of a laser 13 which can be, for example, a helium-neon gas laser having a five milliwatt output. It should be noted that the term "optical radiation" as used herein is meant to encompass not only visible radiation (light), but also that radiation in the electromagnetic spectrum adjacent thereto governed by the laws of optics responsible for operation of a scanner of the type of which is used with the present invention.

The output of laser 13 is directed to means for modulating the same. That is, it is fed to an acousto-optic deflector 14 which continuously modulates the intensity of the beam between maxima and minima to generate a modulated beam which defines the information it is desired be displayed. In this embodiment designed to display alphanumeric characters on a page format, a character generator 16 is provided to generate those characters which are to be displayed, and a controller 17 selectively gates the information defining an appropriate character to the deflector 14 for modulation of the beam.

After the beam has been modulated, it is directed to a first scanner for forming optical field matrices which contain individual segments of the information to be displayed. An acousto-optic deflector 18 is provided for this purpose because of the high speed associated therewith. In this connection, the overall speed of the preferred embodiment being described is dependent upon the speed with which optical matrices can be sequentially formed. Deflector 18 deflects the beam in a raster scan pattern defining the optical field matrices.

The formation of the sequential matrices must be correlated with the modulations to include in each matrix being formed that information it is desired be displayed at the location at which such matrix will be projected on the display area. More particularly, in this particular embodiment, operation of deflector 18 is correlated with operation of deflector 14 to assure that the timing of the beam modulation to incorporate in it information it is desired be displayed at a particular location, coincides with the formation of the optical field matrix to be projected to such particular location.

It should be noted that depending upon the particular acousto-optic deflector selected for deflector 18, it may be appropriate to expand the beam via a telescope, for example, prior to it being furnished to the deflector in order to meet the deflector aperture requirements.

The output of deflector 18 is focused via a conventional positive focusing lens 19 to an intermediate image focal plane represented at 21. The beam is reflected by folding mirror 22 to place image focal plane 21 at a suitable location for further processing of the beam.

It will be noted that the beam is passed through an optical element or system enclosed within the dotted line enclosure 23, after being imaged at plane 21. The purpose of optics 23 is to compensate for any convergence or divergence in the beam caused, for example, by deflector 18. That is, the beam emanating from acousto-optic deflector 18 will be either convergent or divergent (the cylindrical lensing effect) if the rate of deflector scan is greater than the transit time of the beam therethrough.

Typically, relatively complex lens arrangements are utilized with acousto-optic deflectors driven at a high scan rate, to compensate for beam convergence or divergence due to the cylindrical lens effect. However, such lens arrangements generally are quite expensive to fabricate and are inflexible. That is, each arrangement is designed for a particular scan rate, and if it is desired to change or vary such scan rate, different compensating lens arrangements will be required.

As a particularly salient feature of the apparatus in which the instant invention is used, convergence or divergence of the beam is corrected by a simple optical element. More particularly, the enclosure 23 delineates a simple optical element 24 which is, for example, a plate of glass or other optically transmissive material, angularly related to the beam path a predetermined amount to astigmatically correct any deviation in the angular relationship in the beam wave front relative to the desired beam path. That is, the astigmatism known to be associated with the transmission of an optical beam through surfaces which are angularly related to the path of such beam, is used to compensate for the convergence or divergence of the beam caused by the cylindrical lensing effect of deflector 18.

The beam divergence caused by the cylindrical lens effect is given by $$\Delta\Theta = \frac{\lambda}{v^2} \times \frac{\Delta F}{T} \times D;$$

where

λ—wavelength of light
γ—acoustic velocity in the deflector
ΔF—scan frequency bandwidth
τ—time of scan
D—optical beam aperture In the case of $TeO_2$ crystal, $\gamma = 0.617\times10^6$ mm/sec when $\lambda = 0.6$ microns
$\Delta F = 25$ MHZ
$T = 10\times10^{-6}$ sec
$D = 1$ mm
$\Delta\theta = 4\times10^{-3}$ rad The effect of this divergence is to introduce an astigmatic aberration given by $$\Delta l_s = \frac{2F^2}{D} \times \Delta\Theta;$$

where F is the focal length of the focusing lens in front of the deflector. When the focal length F is 5 mm, the value for this astigmatism is 0.2 mm.

This astigmatism can be compensated by using a tilted plane parallel glass plate. If T is the thickness of the plate and N is its refractive index, the angle $\theta$ by which it has to be tilted from perpendicular to the beam path to obtain the same but negative astigmatism, is given by $$\Delta l_p = \frac{T}{\sqrt{N^2 - \sin^2\theta}}\left(\frac{N^2\cos^2\theta}{N^2 - \sin^2\theta} - 1\right);$$

For the example cited above, a glass plate of 5 mm thickness having a refractive index of 1.5, has to be tilted approximately 19° to achieve complete correction.

It should be noted that tilted plate 24 not only is a very simple element, its utilization enables the cylindrical lensing effect caused by differing scan rates to be corrected merely by changing the angular relationship of such plate to the beam path. Thus, the utilization of a tilted plate for correction not only replaces the much more expensive lens designs of the past, it provides flexibility.

Figure 2:
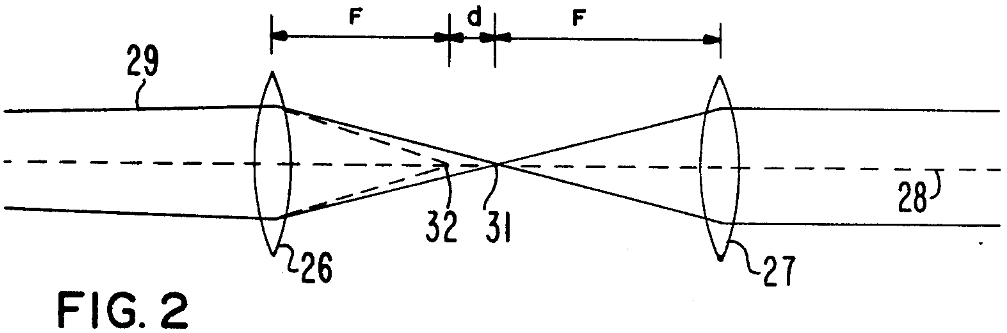
FIG. 2 is an enlarged, schematic view of an alternate arrangement for compensating for variations in the angular relationship of a beam wave front relative to the desired beam path.

FIG. 2 illustrates an alternate optical arrangement for correcting convergence or divergence of the beam. With reference to such figure, a pair of generally afocally related positive lenses 26 and 27 are positioned along a common transmission axis 28 to intercept the beam. As is known, if lenses of this type are exactly afocally related and the optical radiation which enters the first lens, such as lens 26, is parallel, the radiation emanating from the second lens, such as lens 27, will also be parallel. That is, the parallel radiation entering the first lens is brought to focus by such lens at the common focal point, which focused radiation will again be expanded by the exit lens to form a parallel exit beam. However, if the lenses are not truly afocally related, i.e., their focal points are slightly offset from one another, the exit beam will be slightly convergent or divergent relative to the entrance beam.

The above phenomenon can be utilized to advantage with the instant invention to correct for any convergence or divergence of the beam caused by, for example, the cylindrical lensing effect. Again with reference to FIG. 2, the beam 29 of optical radiation is illustrated slightly divergent prior to entering lens 26. The lens 26 will focus such beam at a point 31, a distance "d" (greatly exaggerated for illustrative purposes) from the focal point 32 of the lens. If the focal length of the lens 26 is much greater than the distance "d", the optical radiation will be focused at 31 with virtually little aberration.

Exit lens 27 is positioned along the transmission axis with its focal point coinciding with the focusing point 31 of lens 26. Thus, lens 27 will expand the image at focusing point 31 to a parallel beam of exiting optical radiation. Thus, the optical arrangement represented by the pair of generally afocally related lenses 26 and 27 will correct the divergence in beam 29 by astigmatic refraction.

The amount of offset from a truly afocal configuration which must be made to provide a predetermined degree of correction can be determined for a pair of identical, simple positive glass lenses by the following equation, assuming the focal length F of the lenses is much greater than the amount of offset d;

$$d = \frac{F^2 u}{y}$$

Where:

u = the degree of correction in radians;
y = the width of the optical beam passing through the entrance lens.

Returning to FIG. 1, it should be noted that the optics 23 for correcting for the cylindrical lensing effect can be placed in the beam path either prior to, or after, the intermediate image plane represented at 21.

Image focal plane 21 is also the object focal plane of the scanning system which scans the optical matrices across the display area 11. That is, the first optical element of the display area scanning system is a precision focusing lens 33 positioned to have its object focal point coincide with the image plane 21. As discussed below, this "scan center coupling" is an important factor in achieving with the instant invention, both the high resolution and high speed desired for modern day applications of optical scanning systems.

Figure 3:
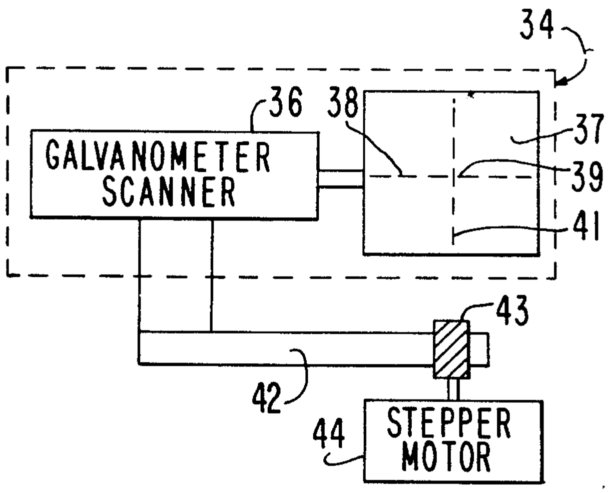
FIG. 3 is an enlarged, schematic view of the display area scanner of the scanning apparatus of FIG. 1.

The scanning of the display area can be achieved with a simple galvanometer scanner, represented in FIG. 3 by the deflecting mirror 34. Such a scanner is known for having high resolution but low speed and rather poor quality scan characteristics. It should be noted that although an acousto-optic deflector type of scanner (as used for forming the optical matrices) is known for its high speed, its resolution typically is relatively low. However, these low resolution characteristics are relatively unimportant in this invention. That is, the range of scan angle required to form an optical matrix is significantly less than the scan angle range which would be required to scan a full page display area. Moreover, the matrix forming scan itself can be focused to almost a point image at plane 21 rather than spread over a display area. The combination of these factors results in the low resolution problem normally associated with an acousto-optical deflector being essentially eliminated. The scanner 34 is designed to do not only line scanning at the display area 11, but also page scanning. That is, it can provide scanning with a single reflective surface about two separate axes which intersect one another at the surface. This dual-direction scanning ability eliminates the need for moving the photoconductor or other imaging medium through the final imaging plane 11 to achieve indexing from one line beam scan to the other, thereby greatly alleviating mechanical complexities associated with, for example, duplicating.

In prior scanning systems utilizing galvanometer scanners, it has only been practical to scan by oscillation about one axis. The relatively high scan rate desired in prior scanning systems has placed such mechanical tolerance limitations on the scanner that the additional complexity which may be associated with scanning about two axes has been avoided. With the instant arrangement, however, in which the galvanometer scanner is only being called upon to provide low speed scanning to place matrices at differing positions, dual-axis scanning by the galvanometer scanner becomes practical.

FIG. 3 provides an enlarged schematic illustration of the display area scanner 34. Such scanner includes a conventional galvanometer scanner 36 which oscillates a mirror 37 defining a reflective surface, about the axis represented at 38. Mirror 37 is positioned in the beam path to intercept the same at a point 39 on the axis 38 and scan the same through a reflector 40 (FIG. 1) to be described infra, across the display area 11. It is this scanning which forms, for example, a word line by projecting the matrices formed by the deflector 18 to discrete locations on the display area. Scanner 36 is itself mounted for rotation about an axis 41 which is orthogonally related to the axis 38 and passes through the point 39. More particularly, its mounting structure includes an arm 42 supported by a block 43 journaled for rotation about an axis which is coaxial with the axis 41. This rotation is represented in the figure by connection to the block 43, of the drive shaft of a stepper motor 44 which may be, for example, a DC servomotor. It is rotation about the axis 41 which provides scanning between discrete lines to be projected to the display area.

In a system meeting the design criteria of the example given below, scanner 36 is designed to scan at a 37 Hz rate, whereas the rate of scan provided by stepper motor 44 is 0.5 Hz. It should be noted that if the geometric arrangement provided in the example is followed, the stepper scan need only be approximately 2.5° in each direction to scan fully across a page at the display area.

Means are also provided for maintaining the imaging focal point of the beam in a flat image field throughout the scan of the display area 11. More particularly, in FIG. 1 the optical element 40 defines a reflective surface 46 which is a segment of a paraboloid. It is disposed to intercept the beam, with the beam path generally parallel to but spaced from the axis of revolution of such paraboloid. As is known, such a reflective surface configuration will vary the distance between the lens 33 and the display area 11 in a manner inversely proportional to the deviation of the focal plane of the image caused by scanner 34.

Figure 4:
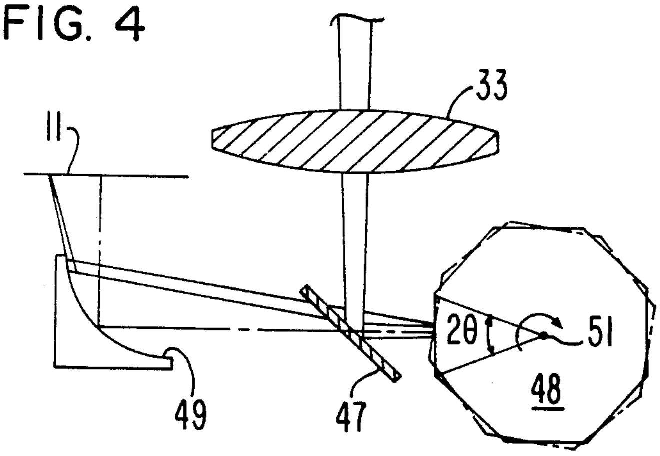
FIG. 4 is an enlarged schematic view of one embodiment of the instant invention as adapted for use in the apparatus of FIG. 1.

FIG. 4 illustrates an optical scanner arrangement of the present invention suitable for use with the apparatus thus far described, which utilizes the spherical aberration provided of a spherical mirror acting as a field lens to maintain the imaging focal point of the beam in a flat image field. FIG. 4 includes the plane 11 which provides the display area for the flat image field, as well as the high resolution focusing lens 33 discussed earlier. A folding mirror 47 intercepts the beam emanating from lens 33 and directs it to a multi-faceted scanning wheel 48 of the conventional type typically utilized to provide high speed scanning. It should be noted that while multi-faceted wheels are capable of providing relatively high speed scanning, quite expensive mechanical mounting for rotation and machining of the reflective facets of the same must normally be undertaken in order to obtain error-free, high resolution scanning.

In keeping with the invention, a spherical mirror 49 uncorrected for spherical aberration is provided intercepting the beam prior to it reaching the display area 11. Such mirror provides a simple optical element which exhibits spherical aberration.

This invention relies upon the change in the length of the optical path caused by rotation of the multi-faceted scanning wheel 48 to compensate for this spherical aberration. That is, as multi-faceted wheel 48 rotates about its axis of rotation 51, the distance through which the beam must travel from the wheel 48 to the display area plane 11 varies. This easily can be understood by referring to FIG. 4 and noting the position of the reflecting facet of the wheel as shown in solid lines, relative to the position of such facet in the slightly rotated position of the wheel represented in dotted lines.

The amount of facet translation can be controlled by appropriately selecting the wheel radius or, in other words, the positioning of the wheel's axis of rotation relative to the facets.

The lateral translation of a wheel facet (defined as $\Delta S_\theta$) is given by the equation:

$$\Delta S_\theta = R \cos \theta_m [\text{Sec } \theta - 1]$$

Where:

$\theta = \frac{1}{2}$ the angle subtended by the wheel facet (see FIG. 4).

The net change in optical path length (defined as $\Delta 1$) is given by $2\Delta S_\theta$.

It will be recognized that if the optical path deviation due to spherical aberration of mirror 49 at each location which corresponds to the aperture defined by the scan beam position, is equal to the optical path length change due to lateral translation of the facet, the resulting scan image field will be flat.

The spherical aberration of a simple spherical mirror is given by:

$$\Delta S_L = K_L [\text{Sec}^2 2\theta - 1]$$

Where:

$K_L$ = a constant dependent on the mirror characteristics; and $\theta$ has the same definition as the above.

A flat image field will be obtained if $$2R \cos \theta_m[\mathrm{Sec}\ \theta - 1] \text{ is equal to } K_L[\mathrm{Sec}^2\ 2\theta - 1]$$

Where:

R is equal to the radius of the circle circumscribing the multi-faceted wheel.

The following table illustrates the relationship between (Sec $\theta - 1$) and (Sec$^2\ 2\theta - 1$) for small scan angles, and how such terms may be made the same merely by dividing (Sec$^2\ 2\theta - 1$) by a constant "c".

| $\theta$ | (Sec$\theta$1) | (Sec$\theta$ − 1 | $\frac{1}{c}$ (Sec$^2\theta$ − 1) |
|---|---|---|---|
| 1 | .000152 | .001219 | .000152 |
| 2 | .000610 | .004890 | .000610 |
| 3 | .001372 | .011070 | .001380 |
| 4 | .002442 | .019752 | .002463 |
| 5 | .003820 | .031091 | .003877 |

Although only a few values of $\theta$ are provided in the above table, the relationship will be apparent and it will be clear that by appropriately selecting the number of scan wheel facets (and thus selecting the range of $\theta$) and by selecting an appropriate wheel radius, the translational movement of each facet along the path of the beam can be made to compensate for the change in optical path length caused by the spherical aberration of mirror 49.

Figure 5:
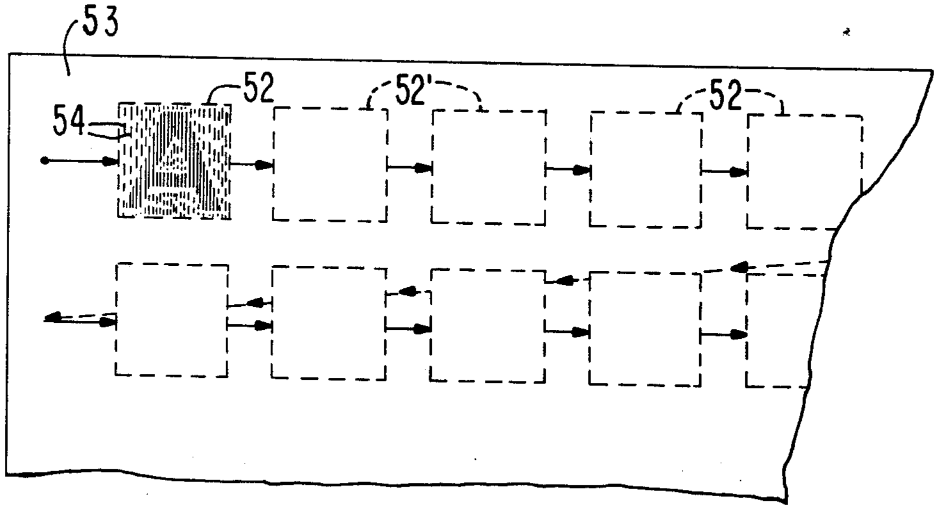
FIG. 5 is a schematic plan view of a portion of an image field illustrating a preferred embodiment of the scanning format generated through the use of the invention.

Reference is now made to FIG. 5 wherein a projection 52 of an optical field matrix generated in accordance with the invention is shown. As can be seen, the optical field matrix as generated includes that information required to project a full alphanumeric character, the letter "A", on the display area. The optical field matrix is scanned across the display area in each field, (the page 53), between discrete locations at which differing segments of information are to be displayed. In the particular example being used for illustration, each one of such discrete locations is one defining the position of an alphanumeric character. Such locations are schematically represented in FIG. 5 by the dotted line enclosures 52'. As the projection of the matrix is scanned between the locations 52', it is modulated to define sequentially the individual segments (the individual alphanumeric characters) of information it is desired to be so displayed.

It should be noted that because each optical matrix is formed with a minimum of scanning by the deflector 18, each of the letters generally will have a high cosmetic quality. And any alignment errors in the page scanning provided by scanner 36 will be reflected in the alignment of adjacent matrices (letters), rather than each of the segments of information to be displayed. The result is that such alignment discrepancies will be virtually unnoticeable. Moreover, since there are two scannings associated with placement of each letter image at the page 53, any errors associated with one scan can be corrected via feedback by the subsequent scan. And while in this particular embodiment designed for alphanumerical character scanning of a page, the discrete locations for each of the matrices are generally adjacent one another, the invention in its broad aspects is quite flexible in the positioning of sequentially formed matrices relative to one another.

While a raster scan pattern is utilized to scan the projections of the optical field matrix between the discrete locations, the number of scan lines is significantly decreased. Only one horizontal scan line is required for each page line of characters, whereas with standard optical scanning systems it is typical to provide 100 scan lines for each page line, including those scan lines used to define the background between displayed page lines. Thus, the speed with which the scanning must take place in order to form a line in accordance with the instant invention, is orders of magnitude less than than required in a conventional scanning system. As a practical matter, such speed is limited only by the time required to form the optical field matrix for each of the discrete locations at which differing segments of information are to be displayed. In other words, the speed is limited only by the time it takes to project an image of the desired character at each of the discrete locations.

It should be noted that although it may appear from FIG. 5 that the scanning between the discrete locations more-or-less stops at each of such locations while the beam is modulated to define the information at such location, the speed of operation is such that there is no such pause. The beam is, in effect, continuously modulated to define the information desired at the discrete locations. Depending upon the particular use of the optical system, such locations may be immediately adjacent and even overlapping one another.

The optical field matrix can be generated in numerous ways. For example, the optical field matrix could be generated by an array of optical radiation sources, such as light emitting diodes, modulated to define the individual segments of the information it is desired be displayed. However, for reasons of simplicity and high speed formation of the matrix, it is preferred that it also be formed by raster scanning as described. Such formation is represented in FIG. 5 by the generally vertical scanning lines 54 in matrix location 52.

The following example is included to complete the description of the apparatus described hereinabove.

EXAMPLE

System Design Criteria

| | |
|---|---|
| 1. Size of Scan Format | : 10 × 12 mms (This represents a 24X reduction for 9 × 12 Inch page) |
| 2. Scan Resolution | : 280 lines/mm (This corresponds to 300 lines/inch at full scale) |
| 3. Time / Character | : .3 milliseconds (3330 Characters/sec) |
| 4. Time / Page line | : 27 milliseconds (Mechanical Scan Frequency 37 Hz) |
| 5. Time / Page | : 2 Seconds |

Design

Laser 13: Helium:Neon Gas Laser - 5 mw output

Acousto-Optic Deflector 14

Specifications:

| | |
|---|---|
| Total number of electronically addressable spots in a page | = 9,405 × 10$^3$. |
| Speed of writing | = 2 sec/page. |
| Modulation rate | = 5 MHz |

Acousto-Optic Deflector 18

Specifications:

| | |
|---|---|
| Modulating Material | = $TeO_2$ |
| Angular Deflection | = 1.026 m rad/MHz |
| Beam Diameter | = 1 mm |
| Beam Divergence | = .6328 m rad |
| Number of Diffraction | |

-continued

| EXAMPLE | |
|---|---|
| Limited Spots | = 40 |
| Angular Deflection | = 25.31 m rad |
| Scan Bandwidth | = 24.67 MHz |
| Carrier Frequency | = 50 MHz |
| Focusing Lens 19: | |
| Focal Length | = 4.82 mm |
| Diameter | = 2 mm |
| Tilted Glass Plate 24: | |
| Refractive Index | = 1.5 |
| Thickness | = 5 mm |
| Tilt | = 19.3° |
| Focusing Lens 33: | |
| Focal Length | = 75 mm |
| Diameter | = 31.13 mm |
| Galvoscanner 34: | |
| Reflective surface size | = 30 mm × 42 mm |
| Angular Scan | = .067 radians |
| Wordline rate | = 33 lines/sec. |
| Wordline sweep angle | = .067 radians |
| Line Indexing rate | = 33 steps/sec. |
| Line Indexing step angle | = .067/2700 radians |
| Line Indexing sweep angle | = .073/66 radians |
| Parabolic Reflective Surface 46: | |
| Focal Distance: | = 100 mm |
| Size | = 15 mm Aperture |
| Size of the Spot on the Parabola | = 2 mm |

The distance between the image plane (display area 11) and the parabola reflective surface is equal to 10 mm.

Figure 6:
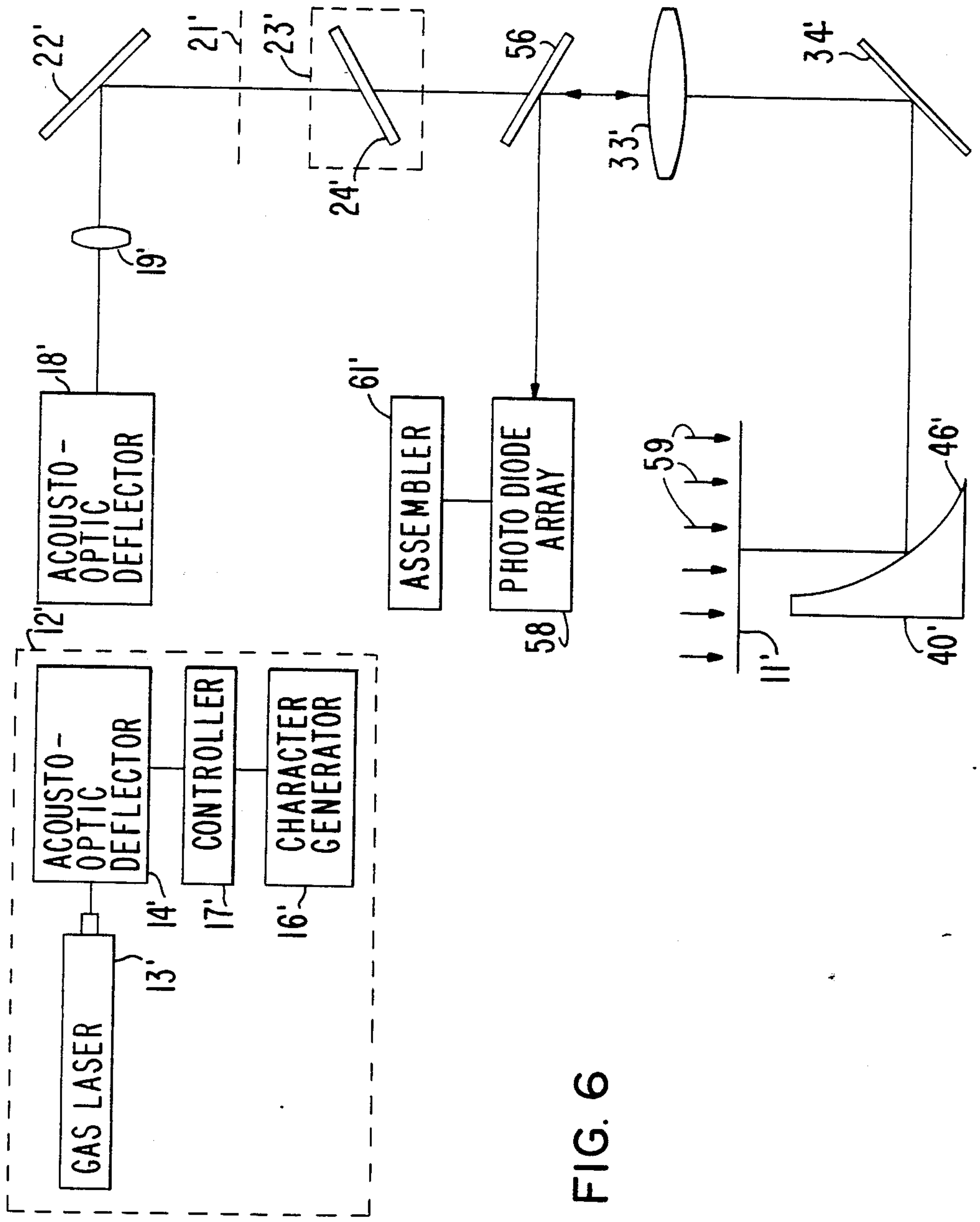
FIG. 6 is a schematic illustration of a preferred embodiment of a combined reading, writing optical scanning apparatus in which the invention is used.

As mentioned previously, the formatting method characteristic of the apparatus in which the instant invention is used is applicable to reading information projected at a display area, as well as writing or displaying such information. FIG. 6 is a schematic illustration of a combined reading/writing system.

The embodiment of FIG. 6 is the same as the previously described embodiment of FIG. 1, insofar as writing or displaying of information is concerned. Those elements which are common to the embodiments of FIG. 1 and FIG. 6 are referred to in FIG. 6 by the prime of the reference numerals used in FIG. 1, and will not again be described in detail. The embodiment of FIG. 6 differs from the embodiment of FIG. 1 in that a reflective surface represented by dichoric reflector 56 is positioned in the path of the beam to reflect optical radiation returning along the beam axis from the display area 11', but to transmit optical radiation originally provided by laser 13'. Lens 33 images such returned radiation onto means for detecting the information in an optical field matrix of the type described, such as is represented by two-dimensional photodiode array 58.

In the reading of optically decodable information provided in a page format, for example, at the display area 11', the full area in back illuminated, as is represented by the arrows 59. The display area 11' is then scanned by scanner 34' in the same manner described in connection with FIG. 1. That is, the scanner 34' sequentially scans in a raster scan pattern, between discrete locations on the display area which are substantially less in geometric extent than the entire display area to be read. Each of these discrete locations will contain a segment of the entire information to be read. Thus scanner 34' will, in effect, sequentially form optical field matrices defining the decodable information contained respectively at the discrete locations, and sequentially reflect the same in a return direction along the beam path. Each of these optical field matrices will include two generally orthogonally related dimensions along which differing portions of the segments of information are provided.

Each optical field matrix will pass through imaging lens 33 and be directed by reflector 56 toward two dimensional photodiode array 58. The field matrices detected sequentially by the array are then processed suitably as desired, such as by being decoded and combined to define the entire information provided at the display area 11' at any given time. This processing is schematically represented in FIG. 6 by the inclusion of an assembler 61.

It should be noted that while the system for reading optically decodable information in accordance with the invention is described in combination with a system for writing information, from the broad standpoint the invention is useful to read information whether or not the overall system is designed to both read and write information.

Although the invention has been described in connection with a preferred embodiment, it will be appreciated by those skilled in the art that various changes can be made without departing from its scope. Moreover, the aspects of the scanning system which provide a flat image field will find use separate and apart from either the method or the overall apparatus. And the overall apparatus which provides "scan center coupling" can be implemented, if desired, without the final stage being designed to provide a flat image field. It is intended, therefore, that the coverage afforded applicant be determined only by the claims and their equivalent language. In this connection, the term "deflecting" as used throughout such claims and in this specification is meant to encompass both reflection and refraction.

I claim:

1. An optical scanner comprising:

A. means defining a display area having a generally flat image field across which a beam of optical radiation is to be scanned;

B. means for providing a beam of optical radiation to be scanned;

C. means for modulating said beam of optical radiation to define with the same information it is desired be displayed at said display area;

D. a display area scanner positioned to intercept said beam of optical radiation after it is modulated to project the same to said display area;

E. a simple optical element which exhibits spherical aberration disposed to intercept said beam prior to the same reaching said display area and with which the remaining optical elements associated with said display area scanner cooperate by utilizing the variation of focal length provided by said spherical aberration to maintain the imaging focal point of said beam in said flat image field.

2. An optical scanner according to claim 1 wherein said simple optical element exhibiting spherical aberration is a mirror.

3. An optical scanner according to claim 2 wherein said display area scanner comprises a deflector positioned in the path of said beam mounted for rotation relative to said generally flat image field to scan said beam across the same, the axis of rotation of said deflector being positioned relative to the spherical aberration provided by said simple optical element to cause translational movement of the deflection of said beam along its path compensating for the changes in the distance over which said beam must travel for focus in said generally flat image field in a scan thereacross caused by said rotation.

* * * * *